US012398864B2

(12) United States Patent
Shih

(10) Patent No.: US 12,398,864 B2
(45) Date of Patent: Aug. 26, 2025

(54) HOLDER-AND-EMITTING-MEMBER-SEPARABLE LIGHT SOURCE MODULE

(71) Applicant: TRUE OPTINNO CO., LTD, Hsinchu (TW)

(72) Inventor: Jeng Chyan Shih, Hsinchu (TW)

(73) Assignee: TRUE OPTINNO CO., LTD, Hsinchu (TW)

( * ) Notice: Subject to any disclaimer, the term of this patent is extended or adjusted under 35 U.S.C. 154(b) by 0 days.

(21) Appl. No.: 18/987,461

(22) Filed: Dec. 19, 2024

(65) Prior Publication Data

US 2025/0207764 A1 Jun. 26, 2025

(30) Foreign Application Priority Data

Dec. 20, 2023 (TW) ................................ 112149797

(51) Int. Cl.

| | |
|---|---|
| ***F21V 19/00*** | (2006.01) |
| ***F21V 14/02*** | (2006.01) |
| ***F21V 19/04*** | (2006.01) |
| ***F21V 23/04*** | (2006.01) |
| ***F21V 29/74*** | (2015.01) |
| ***F21V 29/89*** | (2015.01) |
| ***F21Y 115/10*** | (2016.01) |

(52) U.S. Cl.

CPC .......... *F21V 19/0055* (2013.01); *F21V 14/02* (2013.01); *F21V 19/04* (2013.01); *F21V 23/04* (2013.01); *F21V 29/74* (2015.01); *F21V 29/89* (2015.01); *F21Y 2115/10* (2016.08)

(58) Field of Classification Search

CPC ...... F21V 19/0055; F21V 29/74; F21V 29/89; F21V 14/02; F21V 19/04; F21V 23/04

See application file for complete search history.

(56) References Cited

U.S. PATENT DOCUMENTS

| | | | | |
|---|---|---|---|---|
| 11,022,259 | B2 * | 6/2021 | Bailey | F21S 8/024 |
| 2018/0149349 | A1 * | 5/2018 | Shum | F21V 29/83 |
| 2018/0206305 | A1 * | 7/2018 | Van Winkle | F21S 8/026 |
| 2018/0231199 | A1 * | 8/2018 | Chien | F21V 17/02 |
| 2020/0217495 | A1 * | 7/2020 | Shum | H05B 45/395 |
| 2022/0003397 | A1 * | 1/2022 | Zhang | F21V 3/00 |
| 2025/0067407 | A1 * | 2/2025 | Huang | F21V 29/70 |
| 2025/0075865 | A1 * | 3/2025 | Xu | F21V 23/04 |

* cited by examiner

*Primary Examiner* — Bryon T Gyllstrom
(74) *Attorney, Agent, or Firm* — Maschoff Brennan

(57) ABSTRACT

A holder-and-emitting-member-separable light source module, which is a recessed light, a track light or an LED bulb, including a light source holder and a light-emitting member. The light source holder includes a heat dissipation component, a power contact, a circuit contact and a push switch. The light-emitting member includes a plurality of LED chips, a light circuit board, a power management module and a corresponding circuit contact. The light-emitting member is detachably fixed to the light source holder. When the light-emitting member is fixed to the light source holder, the circuit contact is in contact with the corresponding circuit contact. Thus, when an electronic component such as an LED chip or a power module is damaged, only the light-emitting member of the light source module need to be replaced without replacing the light source holder.

7 Claims, 6 Drawing Sheets

HOLDER-AND-EMITTING-MEMBER-SEPARABLE LIGHT SOURCE MODULE

FIELD OF THE INVENTION

The present invention relates to an LED light source, and more particularly relates to a holder-and-emitting-member-separable light source module.

BACKGROUND OF THE INVENTION

LED light sources have become mainstream in the market due to their low energy consumption and high brightness characteristics. However, LED chips and power modules in the LED light sources are more susceptible to aging and damage than other components of the light source. Due to the non-detachable one-piece design of LED light source products such as LED recessed lights, LED track lights and LED bulbs, users are unable to repair the LED light source by replacing only the LED circuit board when the LED chip or power module is damaged. Therefore, once the LED circuit board is damaged, it can only be replaced together with other components such as heat dissipation elements and circuits, which are extremely durable. This results in significant air pollution caused by the extensive recycling and melting of the LED light source products.

SUMMARY OF THE INVENTION

Accordingly, one objective of the present invention is to provide a holder-and-emitting-member-separable light source module, which allows users to replace only a portion of the light source rather than the entire light source module when the LED chips, power module, or other electronic components on the light board are damaged.

In order to overcome the technical problems in prior art, the present invention provides a holder-and-emitting-member-separable light source module, comprising: a light source holder, including a heat dissipation component, a power contact, a circuit contact and a push switch, the power contact being provided for connecting to a power source, and an electrical connection between the circuit contact and the power contact being controlled by the push switch; and a light-emitting member, including a plurality of LED chips, a light circuit board, a power management module and a corresponding circuit contact, the plurality of LED chips and the power management module being disposed on the light circuit board and electrically connected to the corresponding circuit contact, the light-emitting member being detachably fixed to the light source holder, wherein when the light-emitting member is fixed to the light source holder, the circuit contact is in contact with the corresponding circuit contact, and the push switch is pressed by the light-emitting member so that the electrical connection is formed between the circuit contact and the power contact, and the plurality of LED chips are electrically connected to the power source through the power management module, the corresponding circuit contact, the circuit contact and the power contact, wherein the holder-and-emitting-member-separable light source module is a recessed light, a track light or an LED bulb.

In one embodiment of the present invention, the holder-and-emitting-member-separable light source module is provided, wherein the heat dissipation component includes heat dissipation fins.

In one embodiment of the present invention, the holder-and-emitting-member-separable light source module is provided, wherein the heat dissipation component is a metal casing.

In one embodiment of the present invention, the holder-and-emitting-member-separable light source module is provided, wherein the light source holder includes a screw portion, the light-emitting member includes a corresponding screw portion, and the corresponding screw portion of the light-emitting member is detachably screwed to the screw portion of the light source holder.

In one embodiment of the present invention, the holder-and-emitting-member-separable light source module is provided, wherein the circuit contact includes two elastic contact elements symmetrical about the screw portion.

In one embodiment of the present invention, the holder-and-emitting-member-separable light source module is provided, wherein the corresponding circuit contact includes inner annular circuit and outer annular circuit concentric around the corresponding screw portion.

In one embodiment of the present invention, the holder-and-emitting-member-separable light source module is provided, wherein the light source holder includes a direction-adjusting bracket.

With the technical means adopted by holder-and-emitting-member-separable light source module of the present invention, the light-emitting member is detachable from the light source holder. Therefore, if any component in the light-emitting member is damaged, the user can replace only the light-emitting member without the necessity of replacing the entire light source, thereby achieving cost savings. Additionally, when the user replaces the light-emitting member, the light source holder can remain in its mounted position, eliminating the inconvenience of demounting and reinstalling the light source holder, making it more suitable for recessed lights which are difficult to demount.

DETAILED DESCRIPTION OF THE PREFERRED EMBODIMENTS

Figure 1:
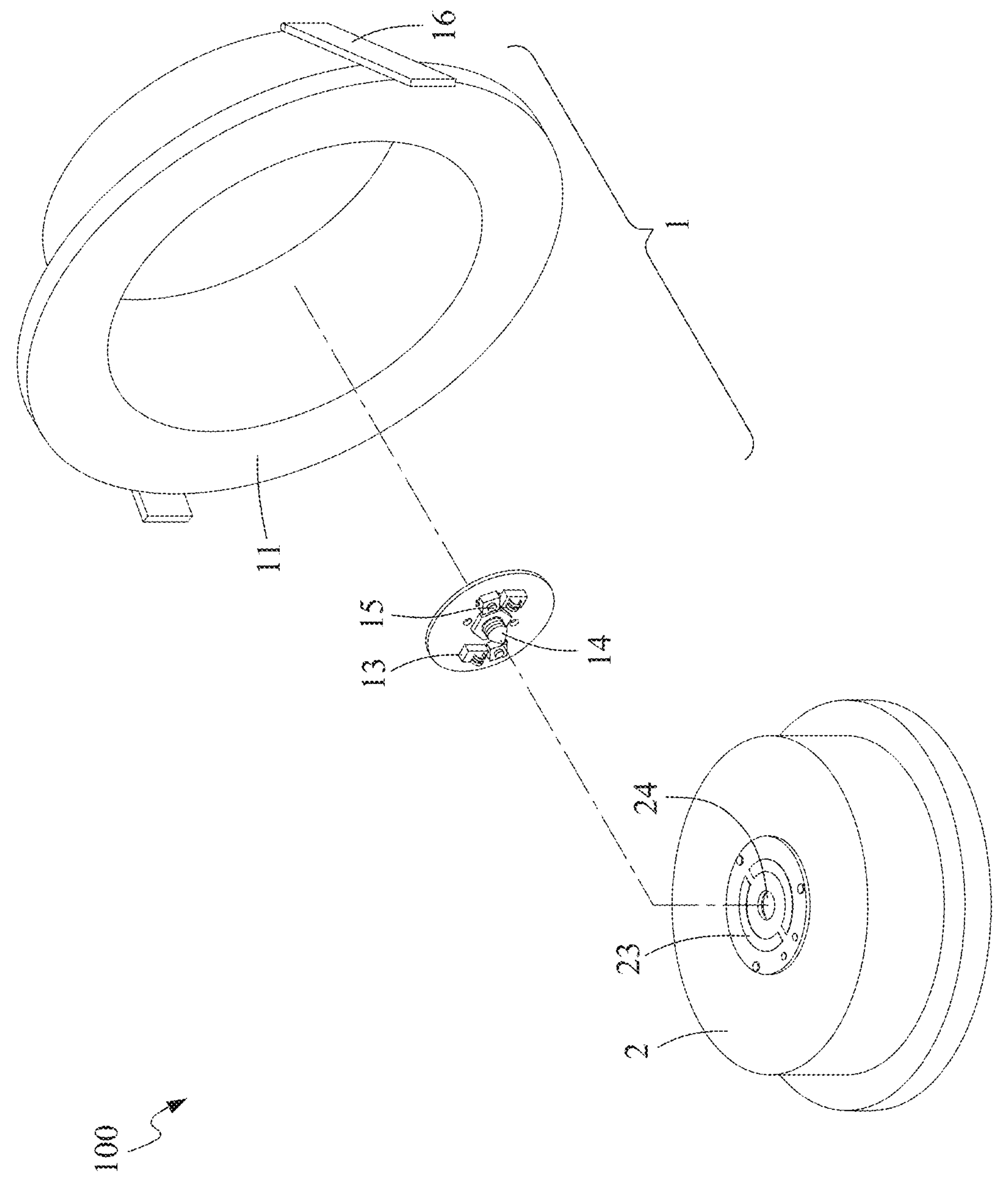
FIG. 1 is a schematic exploded view illustrating a holder-and-emitting-member-separable light source module according to a first embodiment of the present invention.

The preferred embodiments of the present invention are described in detail below with reference to FIG. 1 to FIG. 6. The description is used for explaining the embodiments of the present invention only, but not for limiting the scope of the claims.

As shown in FIGS. 1 to 6, holder-and-emitting-member-separable light source modules 100, 100*a*, 100*b* according to embodiments of the present invention each comprises: a light source holder 1 and a light-emitting member 2. The light-emitting member 2 is detachable from the light source holder 1. Thereby, if any component in the light-emitting member 2 is damaged, the user can replace only the light-emitting member 2 without having to replace the entire light source module, thus achieving cost savings. Additionally, when the user replaces the light-emitting member 2, the light source holder 1 can remain in its mounted position, eliminating the inconvenience of demounting and reinstalling the light source holder 1.

The light source holder 1 is detachably mounted at a mounting position of a structure such as a fixed lamp holder, a recessed hole, or a track rail. In the first embodiment as shown in FIGS. 1 to 3, the holder-and-emitting-member-separable light source module 100 is a recessed light, mounted at a ceiling recess hole through a spring clip 16 of the light source holder 1.

Figure 2:
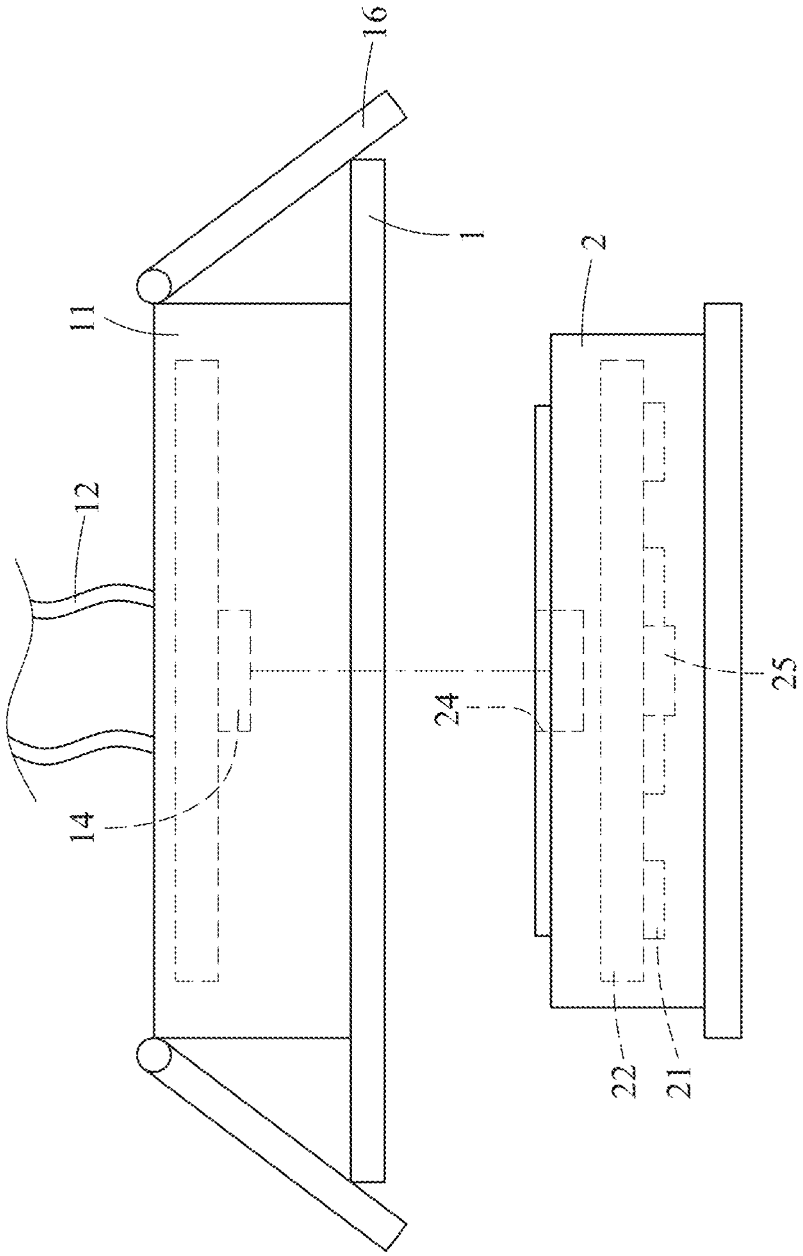
FIG. 2 is a schematic exploded side view illustrating the holder-and-emitting-member-separable light source module according to the first embodiment of the present invention.
Figure 3:
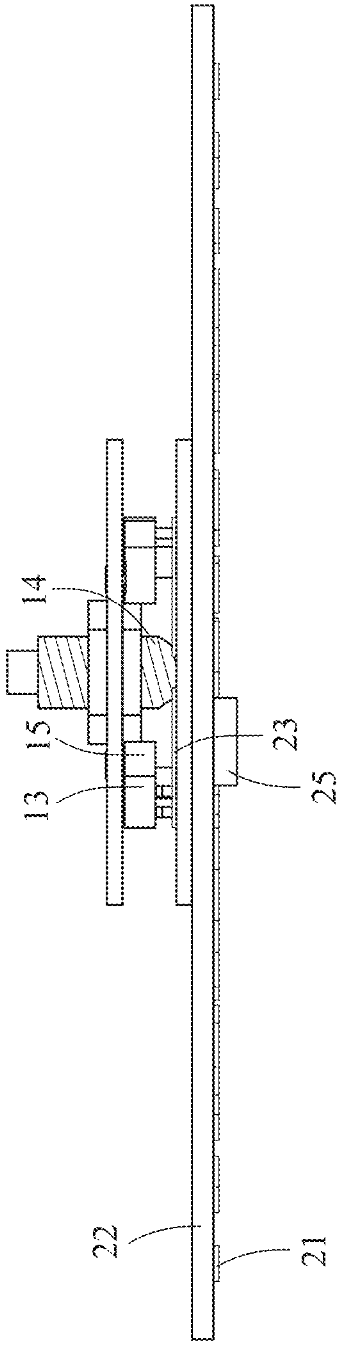
FIG. 3 is a schematic side view illustrating the holder-and-emitting-member-separable light source module according to the first embodiment of the present invention.

As shown in FIGS. 1 to 3, the light source holder 1 has a heat dissipation component 11, a power contact 12, a circuit contact 13 and a push switch 15. When the user replaces the more easily damaged light-emitting member 2, the extremely durable light source holder 1 (including the extremely durable heat dissipation component 11, power contact 12, circuit contact 13, and push switch 15) does not need to be replaced. In this embodiment, the heat dissipation component 11 is a metal casing that efficiently transfers heat generated by the light-emitting member 2 over a wide area by means of good thermal conductivity. The power contact 12 is provided for connecting to a power source for power supply. The circuit contact 13 is electrically connected with the power contact 12 and the circuit contact 13 serves as an electronic contact for contacting the light-emitting member 2. The electrical connection between the circuit contact 13 and the power contact 12 is controlled by the push switch 15.

The light-emitting member 2 has a plurality of LED chips 21, a light circuit board 22, a power management module 25 and corresponding circuit contacts 23. The plurality of LED chips 21 and the power management module 25 are disposed on the light circuit board 22 and electrically connected to the corresponding circuit contacts 23. The power management module 25 is for driving the LED chips 21. The light-emitting member 2 is detachably fixed to the light source holder 1. When the light-emitting member 2 is fixed to the light source holder 1, the circuit contact 13 contacts the corresponding circuit contact 23, and the push switch 15 is pressed by the light-emitting member 2 so that the electrical connection is formed between the circuit contact 13 and the power contact 12. At this time, the plurality of LED chips 21 are electrically connected to the power source through the power management module 25, the corresponding circuit contacts 23, the circuit contact 13, and the power contact 12. When the push switch 15 is not pressed, it causes the electrical connection between the plurality of LED chips 21 and the power source to become an open circuit, thereby preventing the possibility of electric shock.

In this embodiment, the light source holder 1 includes a screw portion 14, and the light-emitting member 2 includes a corresponding screw portion 24. The corresponding screw portion 24 of the light-emitting member 2 is detachably screwed to the screw portion 14 of the light source holder 1. The screw portion 14 is arranged at the center of a circular plate. The screw portion 14 is a screw tube, and the corresponding screw portion 24 is a screw hole. In other embodiments, the screw portion 14 may be a screw hole, and the corresponding screw portion 24 may be a screw tube. Both configurations allow the light-emitting member 2 to be installed to and demounted from the light source holder 1 in a screwed manner. It goes without saying that the present invention is not limited to this. In other embodiments, the light source holder 1 and light-emitting member 2 may also be fixed in a magnetic, clipping, clamping, or other manner.

In the first embodiment, the circuit contact 13 has two elastic contact elements symmetrical about the screw portion 14. The elastic contact elements have bent metal pieces, allowing elastic deformation when contacting the corresponding circuit contacts 23. In other embodiments, the circuit contact 13 may also be at different distances from the screw portion 14 as shown in older-and-emitting-member-separable light source module 100*a* of the second embodiment in FIG. 4. The corresponding circuit contact 23 comprises two semi-circular circuit paths concentric around the corresponding screw portion 24.

Figure 4:
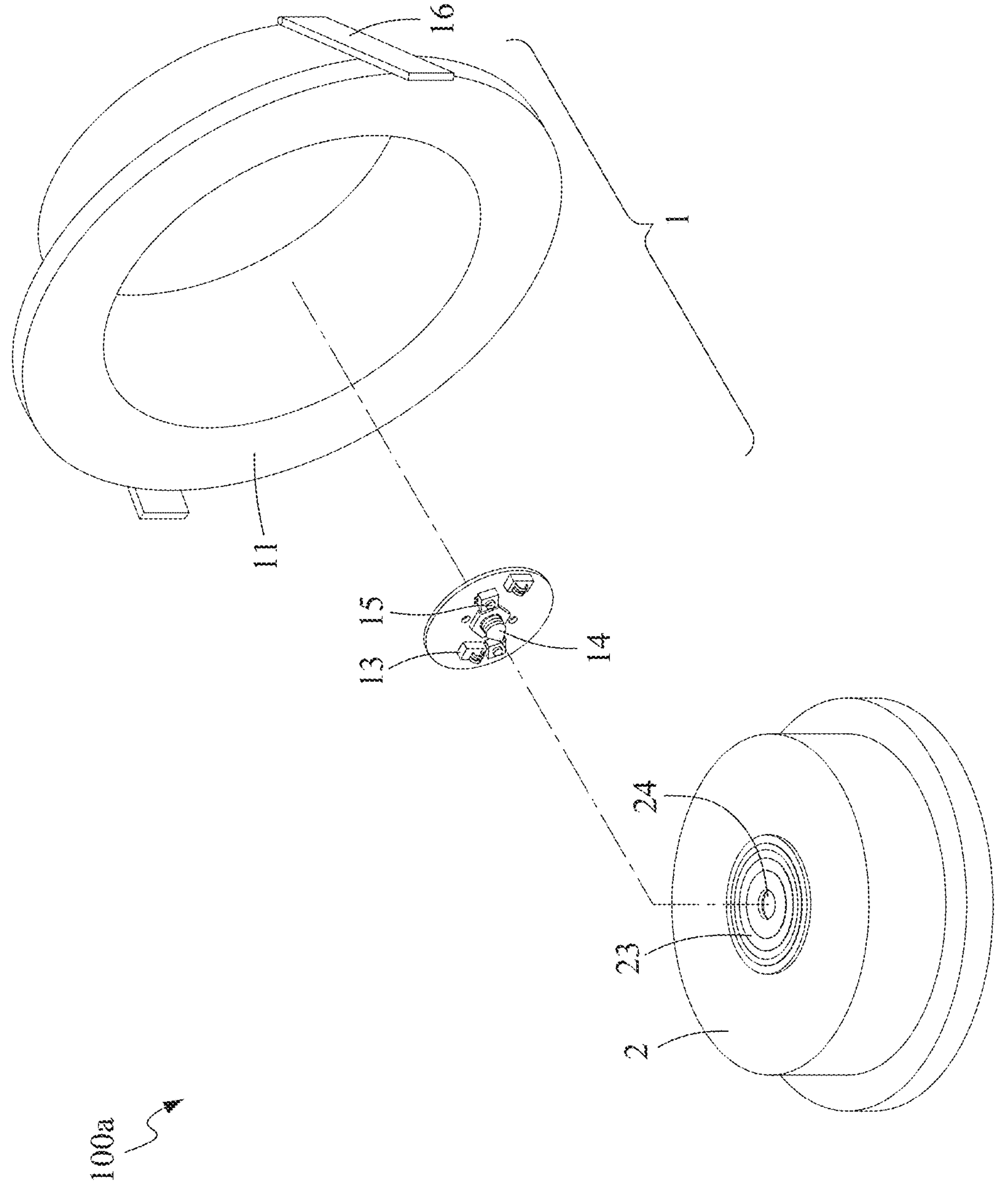
FIG. 4 is a schematic exploded view illustrating a holder-and-emitting-member-separable light source module according to a second embodiment of the present invention.

As shown in FIG. 4, another difference between the holder-and-emitting-member-separable light source module 100*a* according to the second embodiment of the present invention and the holder-and-emitting-member-separable light source module 100 of the first embodiment is that the corresponding circuit contact 23 has an inner annular circuit and an outer annular circuit concentric around the corresponding screw portion 24.

Figure 5:
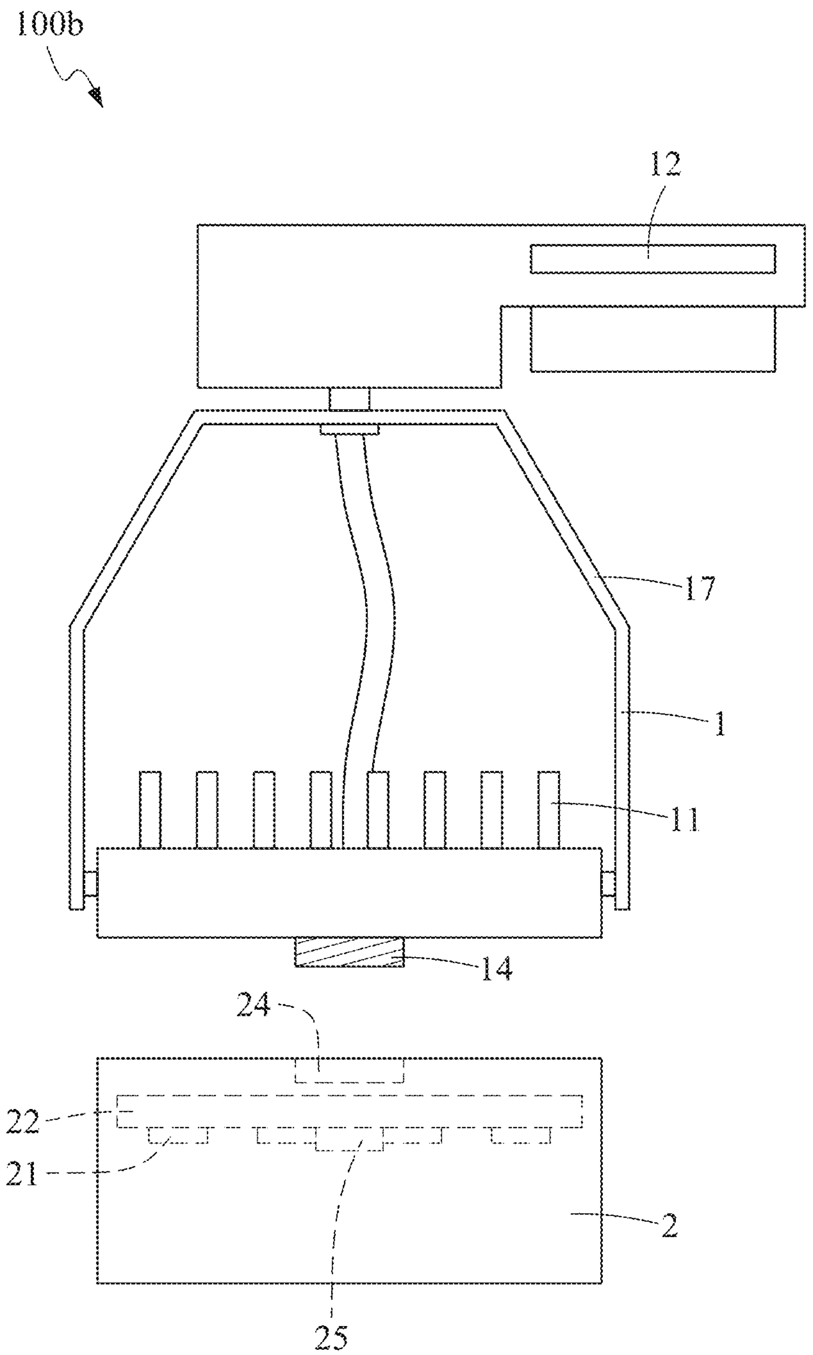
FIG. 5 is a schematic exploded side view illustrating a holder-and-emitting-member-separable light source module according to a third embodiment of the present invention.

As shown in FIG. 5, the holder-and-emitting-member-separable light source module 100*b* according to the third embodiment of the present invention is a track light. The light source holder 1 includes a direction-adjusting bracket 17 to adjust the orientation of the LED chips 21. The heat dissipation component 11 has heat dissipation fins.

Figure 6:
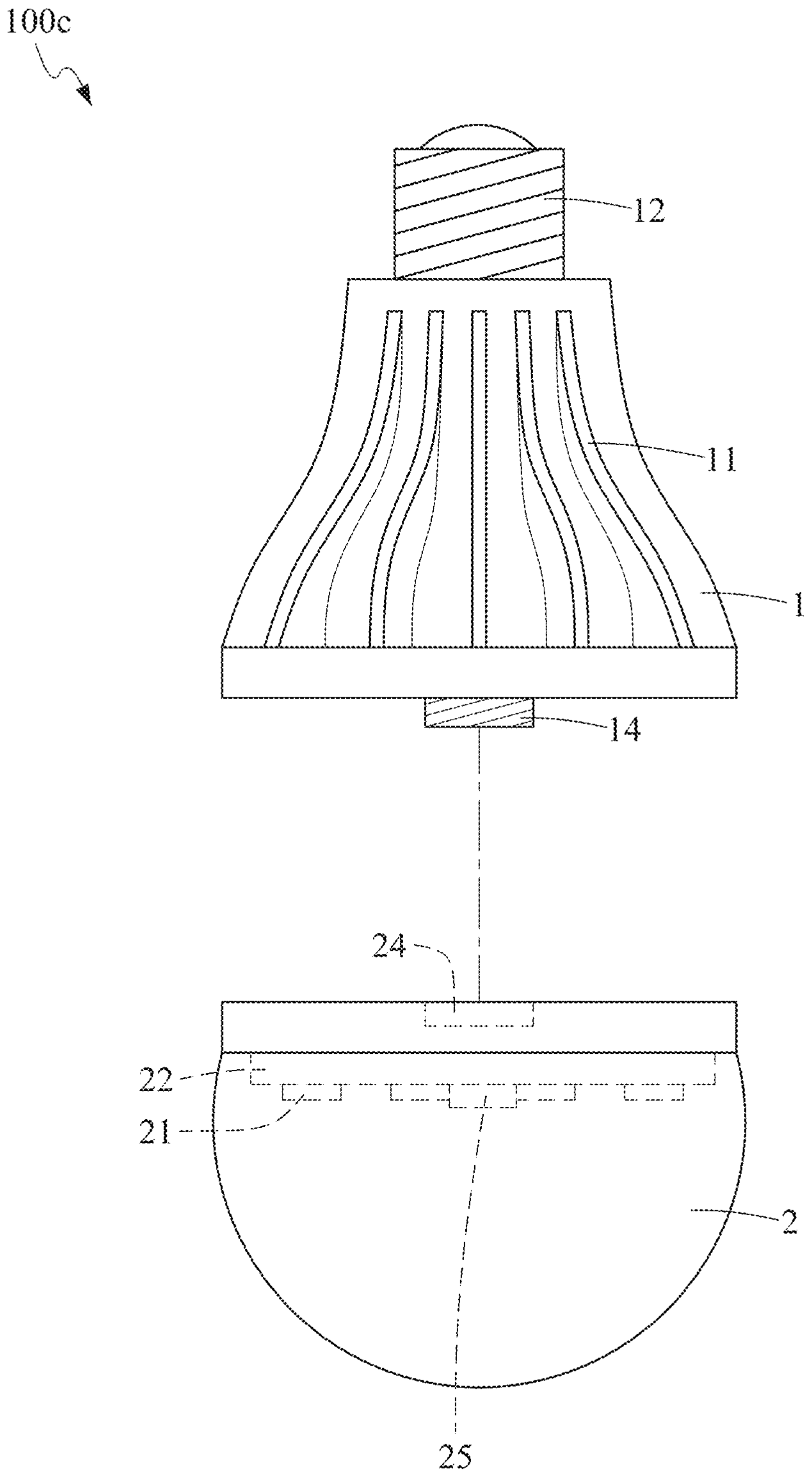
FIG. 6 is a schematic exploded side view illustrating a holder-and-emitting-member-separable light source module according to a fourth embodiment of the present invention.

As shown in FIG. 6, the holder-and-emitting-member-separable light source module 100*c* according to the fourth embodiment of the present invention is an LED bulb. The heat dissipation component 11 comprises heat dissipation fins.

The above description should be considered as only the discussion of the preferred embodiments of the present invention. However, a person having ordinary skill in the art may make various modifications without deviating from the present invention. Those modifications still fall within the scope of the present invention.

What is claimed is:

1. A holder-and-emitting-member-separable light source module, comprising:
   - a light source holder, including a heat dissipation component, a power contact, a circuit contact and a push switch, the power contact being provided for connecting to a power source, and an electrical connection between the circuit contact and the power contact being controlled by the push switch; and
   - a light-emitting member, including a plurality of LED chips, a light circuit board, a power management module and a corresponding circuit contact, the plurality of LED chips and the power management module being disposed on the light circuit board and electrically connected to the corresponding circuit contact, the light-emitting member being detachably fixed to the light source holder, wherein when the light-emitting member is fixed to the light source holder, the circuit contact is in contact with the corresponding circuit contact, and the push switch is pressed by the light-emitting member so that the electrical connection is formed between the circuit contact and the power contact, and the plurality of LED chips are electrically connected to the power source through the power management module, the corresponding circuit contact, the circuit contact and the power contact, wherein the holder-and-emitting-member-separable light source module is a recessed light, a track light or an LED bulb.

2. The holder-and-emitting-member-separable light source module as claimed in claim 1, wherein the heat dissipation component includes heat dissipation fins.

3. The holder-and-emitting-member-separable light source module as claimed in claim 1, wherein the heat dissipation component is a metal casing.

4. The holder-and-emitting-member-separable light source module as claimed in claim 1, wherein the light source holder includes a screw portion, the light-emitting member includes a corresponding screw portion, and the corresponding screw portion of the light-emitting member is detachably screwed to the screw portion of the light source holder.

5. The holder-and-emitting-member-separable light source module as claimed in claim 4, wherein the circuit contact includes two elastic contact elements symmetrical about the screw portion.

6. The holder-and-emitting-member-separable light source module as claimed in claim 1, wherein the corresponding circuit contact includes inner annular circuit and outer annular circuit concentric around the corresponding screw portion.

7. The holder-and-emitting-member-separable light source module as claimed in claim 1, wherein the light source holder includes a direction-adjusting bracket.

* * * * *